(12) United States Patent
DeVos et al.

(10) Patent No.: US 10,094,471 B2
(45) Date of Patent: Oct. 9, 2018

(54) MANUAL PARK RELEASE SYSTEM

(71) Applicant: HI-LEX CONTROLS, INC., Rochester Hills, MI (US)

(72) Inventors: Matthew DeVos, Rochester Hills, MI (US); Eldon Teets, Rochester Hills, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 50 days.

(21) Appl. No.: 15/821,189

(22) Filed: Nov. 22, 2017

(65) Prior Publication Data

US 2018/0094724 A1    Apr. 5, 2018

Related U.S. Application Data

(62) Division of application No. 15/142,910, filed on Apr. 29, 2016, now Pat. No. 10,030,770.

(51) Int. Cl.
| | |
|---|---|
| *F16H 63/34* | (2006.01) |
| *F16H 59/02* | (2006.01) |
| *F16H 61/36* | (2006.01) |
| *F16C 1/10* | (2006.01) |
| *F16C 1/14* | (2006.01) |

(52) U.S. Cl.
CPC ......... *F16H 63/3491* (2013.01); *F16C 1/101* (2013.01); *F16C 1/14* (2013.01); *F16H 59/0278* (2013.01); *F16H 61/36* (2013.01)

(58) Field of Classification Search
CPC ...... F16H 59/10; F16H 63/34; F16H 63/3491; B60T 7/08; B60T 7/102; B60T 7/104; B60T 11/046; G05G 1/04; G05G 5/08; G05G 2700/08; F16K 31/602; F16C 1/101; F16C 1/14
See application file for complete search history.

(56) References Cited

U.S. PATENT DOCUMENTS

| | | | | |
|---|---|---|---|---|
| 4,872,368 A | * | 10/1989 | Porter | B60T 7/047 74/512 |
| 6,105,459 A | * | 8/2000 | Troiano | B60T 7/047 74/512 |
| 6,817,264 B2 | * | 11/2004 | Hiura | B60T 7/102 188/216 |
| 9,616,863 B2 | * | 4/2017 | Pereira | B60T 7/105 |
| 2007/0227290 A1 | * | 10/2007 | Ferenc | B60T 7/105 74/523 |

* cited by examiner

*Primary Examiner* — Adam D Rogers
(74) *Attorney, Agent, or Firm* — Brinks Gilson & Lione

(57) ABSTRACT

A park release system includes a park release handle assembly. The handle assembly comprises a base, a handle pivotally connected to the base, and a lock piece. The handle is pivotable between an open position and a closed position. The lock piece is uniquely designed to selectively lock the handle in open position and to release the handle and allow it to pass back to closed position after the handle is pulled from lock position. The park release system may include a cable connector assembly. The cable connector assembly may comprise a first cable section connectable to a second cable section. The second cable section includes a housing having a slider within a passageway and below a flexible retention beam. The slider is configured to receive and connect to the cable from the first cable section.

10 Claims, 11 Drawing Sheets

MANUAL PARK RELEASE SYSTEM

CROSS-REFERENCE TO RELATED APPLICATION

This application is a divisional application of U.S. patent application Ser. No. 15/142,910, filed Apr. 29, 2016, the contents of which are incorporated herein by reference in their entirety.

FIELD OF THE INVENTION

The present invention relates to a manual park release assembly for releasing a vehicle automatic transmission from park mode.

BACKGROUND INFORMATION

Motor vehicles, such as trucks, cars, and other automobiles equipped with an automatic transmission typically include a shifter for changing between available gear selections. Typical gears in an automatic transmission vehicle include park (P), reverse (R), neutral (N), drive (D), and low gears (1, 2). The shifter connects to a shifter lever, which connects to the motor vehicle transmission by a suitable mechanical and/or electronic operating linkage to effect actuation of the transmission to the selected gear when the shifter is pivoted to the transmission gear's representative position.

One drawback that automatic transmission vehicles face is the ability to easily put the car in neutral and allow the wheels to move freely when the car is turned off. In certain circumstances, such as when towing a vehicle, it is necessary that the wheels be able to move freely without constraints from the transmission. One solution that has been developed to overcome this issue is a park gear release. The park gear release releases the connection between the wheels and the transmission to allow the wheels to turn freely. However, park gear release systems face several different design constraints and issues.

One issue that such release systems have is providing an easily workable release handle while still keeping the design safe. For example, release handle must be accessible to users, but needs to also be safely arranged to prevent accidental activation of the release. For that reason, it may be beneficial for the handle to be stored in a separate compartment and/or locked until used.

A second issue that arises for park release systems is difficulty with installation. The park release typically includes a cable that runs from the handle to the release connection. The cable may be moved in a first direction to release the transmission connection when the handle is moved to a release position. The cable may then be moved back in the opposite direction to reengage the transmission connection when the handle is moved back to the engage position.

Accordingly, the cable must run from the handle, which is accessible in the cab of the vehicle, to the transmission connection. However, running the cable during assembly can be difficult due to parts and components that may block the cable's path. Additionally, changing out the cable or other parts of the system may be difficult as running the cable after assembly of the vehicle is exceedingly challenging.

For these reasons, an improved parking gear release system is needed.

SUMMARY

A park release system includes a park release handle assembly. The handle assembly comprises a base having an opening therethrough and a handle pivotally connected to the base and configured to pivot between a closed position and an open position. A cable is connected to the handle and movable with the handle to actuate a park gear release. A biasing device, such as a torsion spring, may be positioned to bias the handle toward the base.

A lock piece is positioned within the opening in the base. The lock piece includes a body having a front tip, an eyelet formed in the body, and a pin inserted through the eyelet to allow the lock piece to pivot with respect to the base between a front tip up position and a front tip down position. The eyelet has a width that is wider than the diameter of the pin to allow the lock piece to slide between a forward position toward the handle and to a back position away from the handle.

A lock piece reset may be positioned on the handle. The reset may comprise a protrusion positioned to selectively contact the lock piece and move the lock piece from the back position to the forward position when the handle is rotated from the closed position to the open position. The lock piece may be connected to an extension spring. The extension spring may bias the lock piece to pivot the front tip up or down depending on the front or back positioning of the lock piece.

In an embodiment, the handle assembly may be configured to be pulled to rotate the handle to an open position, such as an open locked position, and pulled to release the handle from open locked position to return the handle assembly to the closed position.

In an embodiment, the park release system includes a cable connector assembly. The cable connector assembly may comprise a first cable section and a second cable section connectable to one another. The first cable section includes a cable casing having an opening therethrough to receive a first length of cable and an end length of cable protruding through the cable casing. A cable head is positioned at an end of the end length of cable. The second section of cable includes a housing having a receptacle portion configured to receive the cable casing therein. A passageway is formed within the housing, and a portion of the passageway is defined by a retention beam. The retention beam is capable of flexing away from the passageway. A slider is positioned within the passageway and movable along the passageway. The slider includes a slanted face and an opening in the slanted face configured to receive the cable head and the end length of cable therein. A second length of cable is connected to an end of the slider opposite the slanted face.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A manual park release system is generally presented. The manual park release system is configured to allow a user to release the engagement between a vehicle transmission and the wheels of the vehicle. By releasing the engagement, the wheels are permitted to rotate freely to allow the vehicle to be towed or moved.

The manual park release system may include various novel features to improve the system, including an improved handle and activation mechanism and an improved cable connection device. It will be appreciated that the activation handle and cable connection device may be used together in the same system or separately in systems that do not include the other feature. Additionally, the manual parking release system may include additional novel features and benefits, as set forth below.

Release Handle Assembly

With reference to FIGS. 1-7, a manual park release system may include an improved release handle assembly 10. The handle assembly 10 may be mounted in a vehicle, such as inside the cab of a truck, and accessible to a user.

The handle assembly 10 may comprise a base 12. The base 12 may be any appropriate size and shape, such as generally rectangular. The base 12 may be made out of any appropriate material, such as plastic, polymer, fiberglass, metal, or the like. The base 12 may be mounted at any appropriate location, such as in a confined compartment.

The base 12 may include mounting apertures 14, 16 to fix the base 12 at a desired location within the compartment.

The base 12 may include an opening 20. The opening 20 may be generally rectangular and located on a front face of the base 12. The opening 20 may extend completely through the base 12.

Figure 1:
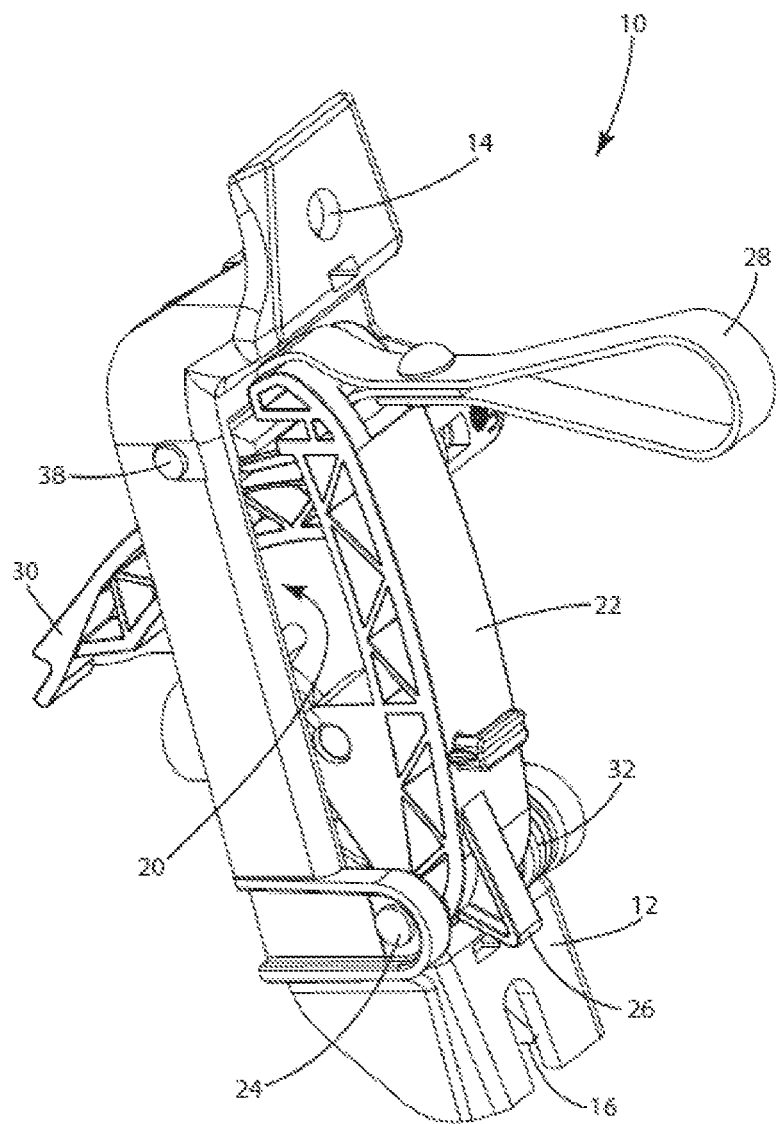
FIG. 1 illustrates a perspective view of a release handle assembly in the closed position.
Figure 2:
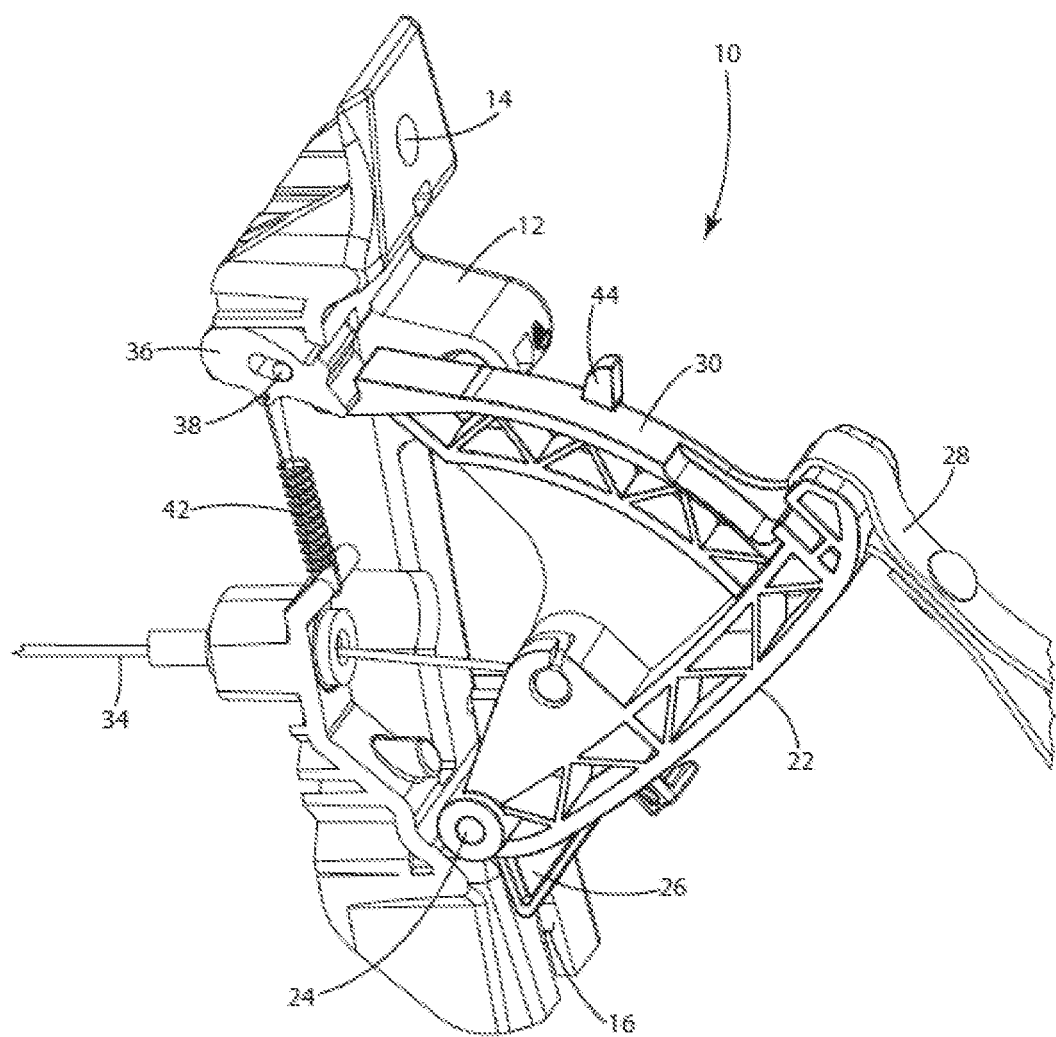
FIG. 2 illustrates a perspective and partial cutaway view of a release handle assembly in the open position.

A handle 22 may be pivotally connected to the base 12. For example, a pin 24 may extend through the base 12 and through a bottom portion of the handle 22. The handle 22 may pivot about the pin 24 between a first closed position near the base 12 (as shown in FIG. 1) and a second open position away from the base 12 (as shown in FIG. 2).

The handle 22 may include a handle stop 26. The handle stop 26 may be located at or near the bottom portion of the handle 22. The handle stop 26 may be configured to abut the base 12 to limit the rotational travel of the handle 22 away from the base 12.

The handle 22 may include a handle strap 28. The handle strap 28 may be made of any appropriate strap material, such as nylon or the like. The strap 28 may be connected to an upper portion of the handle 22 and configured in a loop to assist in pivoting the handle 22 about the pin 24.

The handle 22 may include an arm 30 connected to the handle 22. The arm 30 may extend from the handle 22 toward the base 12. The arm 30 may be positioned to extend through the opening 20 when the handle is in the closed position. The arm 30 may further be configured to assist in locking the handle assembly 10 in the open position, as described in further detail below.

The handle assembly 10 may include a handle spring 32. The handle spring 32 may be configured to pivotally bias the handle 22 toward the base 12. For example, the handle spring 32 may be a torsion spring positioned on the pin 24 or about the handle's axis of rotation and configured to bias the handle 22 toward the base and into the closed position.

A cable 34 may attach to a portion of the handle 22. The cable 34 may be any appropriate type of cable, such as a steel cable or the like. The cable 34 may connect at a first end to an inside portion of the handle 22, on a side adjacent to the base. At a second end, the cable may connect to a park release to disconnect wheels of the vehicle from the transmission, as described above. When the handle 22 is pivoted between the closed and open positions, the cable may travel a distance to actuate the transmission release or reengage the transmission. For example, when the handle 22 is moved to open position, the cable 34 may travel a distance to actuate the transmission release, and when the handle 22 is moved to the closed position, the cable 34 may return to its original position to actuate reengagement of the transmission with the wheels. The cable 34 may include a sheath that surrounds and protects the cable and allows the cable to move therein.

The handle assembly 10 may capable of locking in the open position. As described in further detail below, the handle assembly 10 may include a lock piece 36 configured to lock the handle assembly 10 in place when the handle 22 is pivoted to the open position. The lock piece 36 may be uniquely designed to lock the handle 22 in place when the handle 22 is pulled away from the base 12 to pivot to open position, and to disengage the lock when the handle 22 is again pulled away from the base from the open locked position to allow the handle 22 to return to the closed position.

Figure 3:
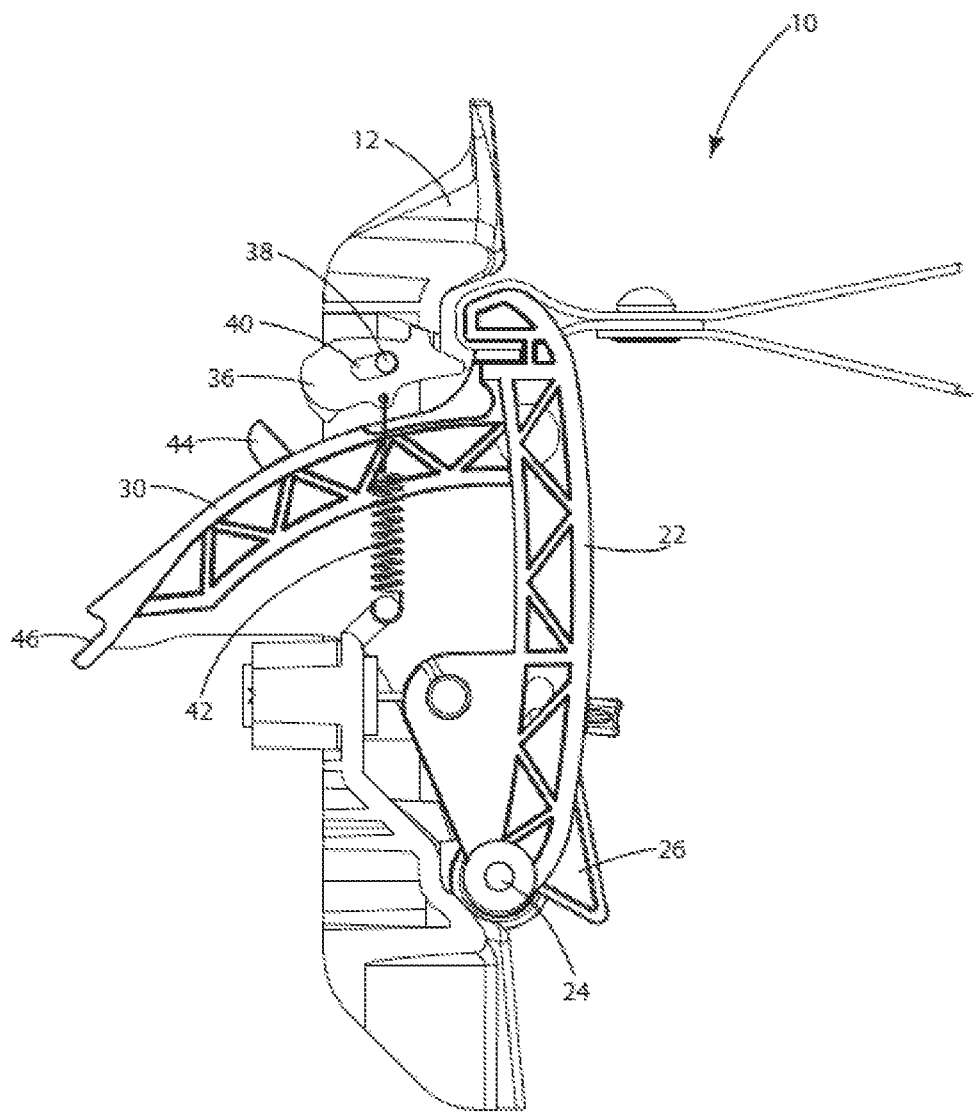
FIG. 3 illustrates a side cutaway view of a release handle assembly in the closed position.
Figure 5:
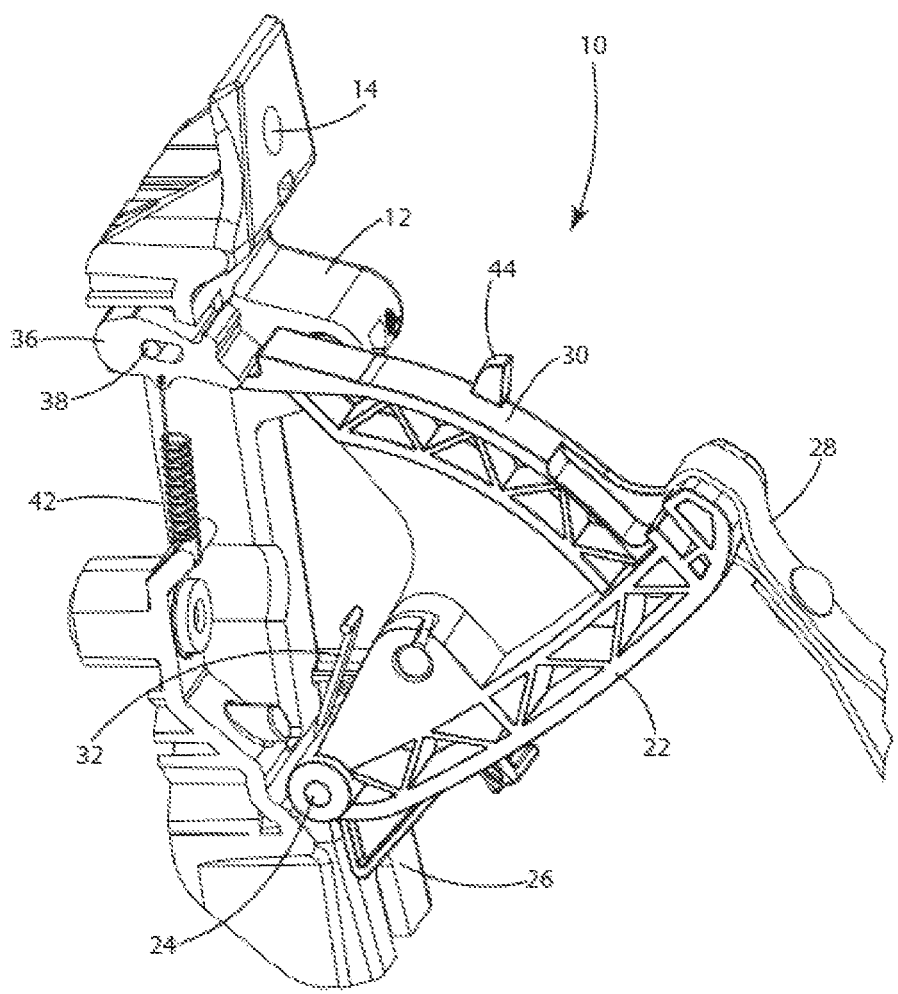
FIG. 5 illustrates a perspective cutaway view of a release handle assembly held in the open position.

The lock piece 36 may be positioned within the opening 20 and held in place by a lock pin 38. The lock pin 38 may extend across the width of the opening 20 and through an eyelet 40 in the lock piece 36. The eyelet 40 may comprise an aperture in the lock piece 36 having a width that is greater than the diameter of the lock pin 38. The wide opening of the eyelet 40 may allow the lock piece 36 to move between two positions, namely, a forward position toward the handle 22 and a back position away from the handle 22. In the forward position, the lock pin 38 may be positioned at the rear of the eyelet 40, as shown in FIG. 5. In the back position, the lock pin 38 may be positioned at the front of the eyelet 40, as shown in FIG. 3.

The lock piece 36 is biased to remain in the forward position or the back position other than when traveling between said positions. For example, the eyelet 40 may include a slight curved shape to bias the lock piece 36 toward the ends of its travel, namely slid all the way forward or slid all the way back. In addition, an extension spring 42 may be connected to between the base 12 and the lock piece 36. The extension spring 42 may be any appropriate type of spring, such as a tension spring. The extension spring 42 may be connected to an underside of the lock piece 36 at a first end and to the base 12 at a second end, to provide a downward biasing force on the lock piece 36. The biasing force, in combination with the slight curve in the eyelet 40 may assist in retaining the lock piece in a forward or back position.

Figure 6:
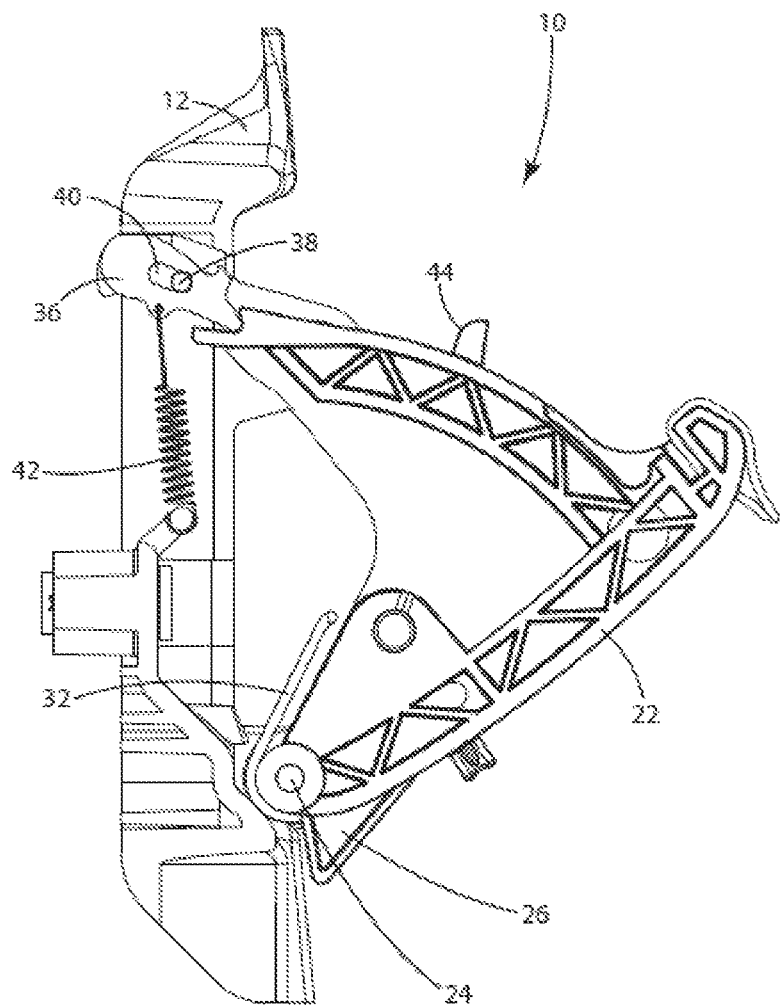
FIG. 6 illustrates a side cutaway view of a release handle assembly in the open locked position.
Figure 7:
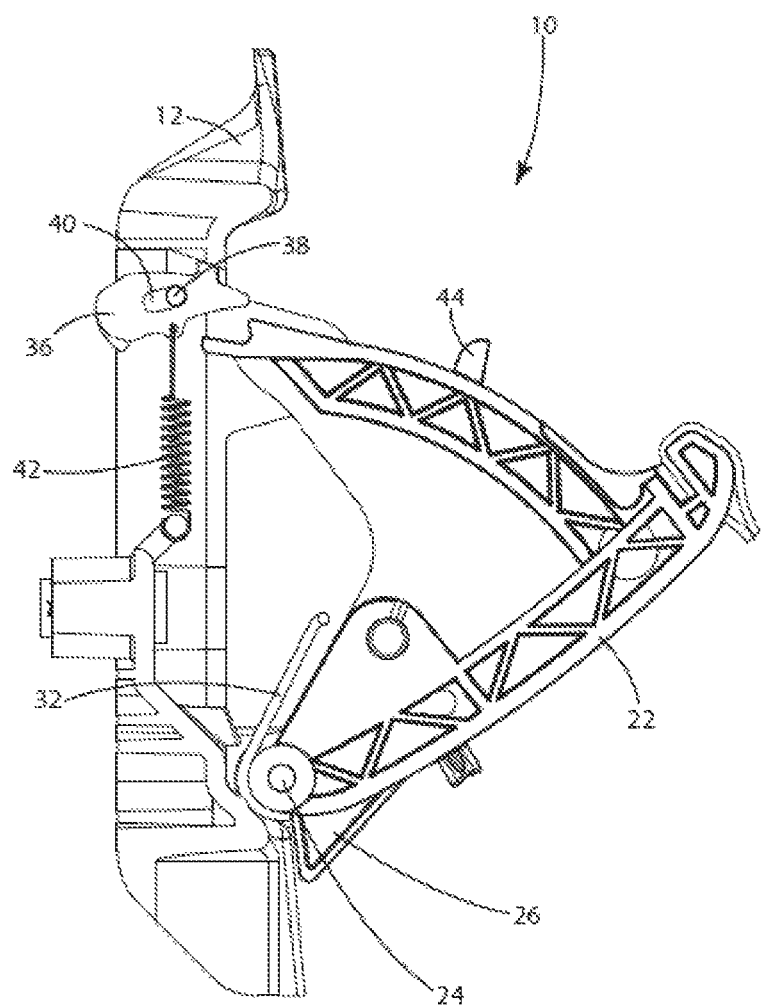
FIG. 7 illustrates a side cutaway view of a release handle assembly after pulled to release where the lock pin is in the back position and the front tip up position.

In addition to sliding between a forward and back position, the lock piece 36 may pivot between up and down positions. In the up position, a front edge of the lock piece 36 may tilt upward, as shown in FIGS. 3 and 7. In the down position, the front edge of the lock piece 36 may tilt downward, as shown in FIGS. 5 and 6. By sliding between the forward position and the back position and pivoting between the up and down positions, the lock piece 36 moves between a passive mode allowing the handle 22 to pass between the open position and the closed position, and a lock mode, that prevents the handle 22 from moving to the closed position when it is in the open position.

In an embodiment, the extension spring 42 may be connected to the underside of the lock piece 36 between the ends of the eyelet 40. The extension spring 42 may be specifically positioned to bias the lock piece 36 into the front edge up position when slid to the back position and to bias the lock piece 36 into the front edge down position when slid to the forward position.

The handle may include a lock piece reset 44. The lock piece reset 44 may be configured to transition the lock piece 36 between the passive and lock modes at the appropriate times. The lock piece reset 44 may comprise a protrusion located on the handle arm 30. The reset 44 may be aligned with a portion of the lock piece 36 to selectively engage the lock piece 36 when traveling between open and closed positions. As described in further detail below, the reset 44 may shift or slide the lock piece 36 between the forward position and the back position as needed to allow the handle assembly 10 to be locked in the open position and the closed position.

In an embodiment, the handle assembly 10 may include a handle lock. The handle lock may lock the handle 22 in the closed position to prevent a user from accidentally or unintentionally opening the handle assembly 10. The handle lock may include a pin or lock that extends through the base 12 and the handle 22 to prevent the handle 22 from being rotated out of closed position, until the lock or pin is removed.

In use, the handle assembly 10 may begin in closed position, as shown in FIG. 3. The handle assembly 10 may be stowed in a compartment within the cab and collapsed in closed position to fit within the compartment. The handle assembly 10 may be configured to be pulled to open and pulled again to close, as described below.

In the closed position, the handle 22 is rotated all the way toward the base 12 and the arm 30 extends through the opening 20. The cable 34 may be extended to the engage position, such that the wheels are engaged with the park gear. As shown in FIG. 3, the lock piece 36 may be positioned in the back-up position (away from the handle with the front edge of the lock piece 36 tilting upward).

Figure 4:
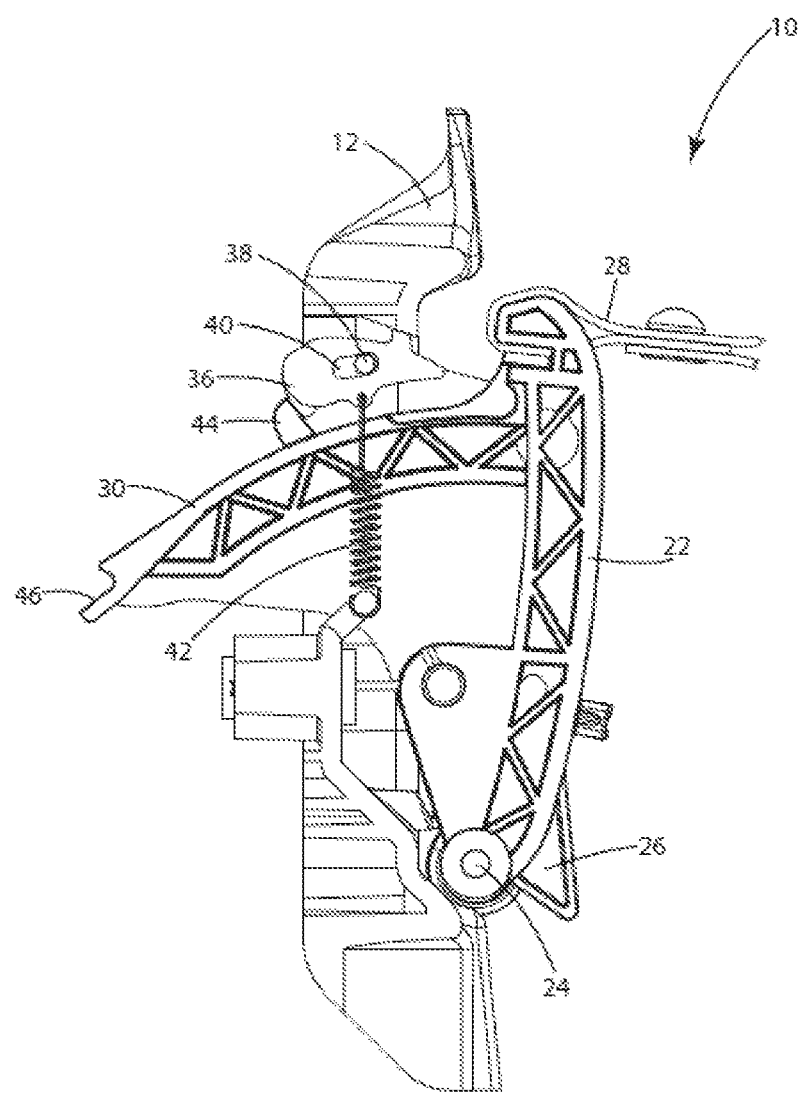
FIG. 4 illustrates a side cutaway view of a release handle assembly in the closed position.

To move the handle assembly 10 to open position, the handle 22 is pulled away from the base 12, such as by pulling the handle strap 28. As the handle 22 rotates away from the base 12, the lock piece 44 contacts a rear portion of the lock piece 36, as shown in FIG. 4. The movement of the handle 22 and lock piece reset 44 drive the lock piece 36 from the back-up position to the forward-down position (toward the handle with the front edge of the lock piece 36 tilting downward) as shown in FIG. 5.

When in the forward-down location, the lock piece 36 is positioned to lock the handle 22 in the open position. For example, a distal end of the arm 30 may include a detent 46. The detent 46 may be sized and shaped to engage the end of the lock piece 36. As shown in FIG. 6, when the handle 22 is pivoted all the way back away from the base 12 then released, the handle spring 32 biases the handle toward the base 12 and against the lock piece 36, pushing the lock piece 36 to back-down position (away from the handle with the front edge of the lock piece 36 tilting downward.

To release the handle assembly 10 from the closed position, the handle 22 is pulled back away from the base 12, as shown in FIG. 7. When the arm 30 disengages the lock piece 36 the extension spring 42 pulls the down on the lock piece to flip it from the back-down position to the back-up position with the front edge of the lock piece 36 tilting up, as shown in FIG. 7. In the back-up position, the up-tilted lock piece 36 allows the arm 30 to clear the lock piece 36 when rotating toward the closed position. The handle 22 may then be released to allow the force from the biasing handle spring 32 to drive the handle 22 back into the closed position.

Cable Connector Assembly

In an embodiment shown in FIGS. 8-14, the manual park release system may include a cable connector assembly 60. The cable connector assembly 60 may be configured to simplify the assembly and disconnection of a cable 62 in the park release system. The cable 62 may generally run from a park release handle, as described above, to a release mechanism between for the park gear.

The cable connector assembly 60 may split the cable 62 into two sections. The first cable section 64 may attach at one end to the park gear release. The second cable section 66 may attach at one end to a release handle as described above. The first and second cable sections 64, 66 may connect to one another as set forth below. It will further be appreciated that the first and second cable sections 64, 66, as described herein, may be rearranged and used on either side of the cable connector assembly 60.

The first cable section 64 may include a casing cap 68 located near its end. The casing cap 68 may be formed out of any appropriate material such as plastic, polymer, metal, or the like. The casing cap 68 may be any appropriate size and shape, such as generally cylindrical or having a circular cross section. Specifically, the casing cap 68 may be sized and shaped to engage the second cable section 66, as described below. An O-ring 70 may be positioned near the end of the casing cap 68. The O-ring 70 may be made of rubber or a similar material and may act as a gasket to seal the connection with the second cable section 66. In an embodiment, the O-ring 70 may provide a waterproof sealed connection to prevent water or other contamination from entering the connection between the first and section cable sections 64, 66.

The casing cap 68 may include a hollow passage to allow the cable 62 to pass through the cap 68. The passage opening may be large enough to allow the cable 62 to move lengthwise within the passage. The cable 62 may slide back and forth as driven by the second cable section to actuate disengagement and reengagement with the park gear.

Figure 8:
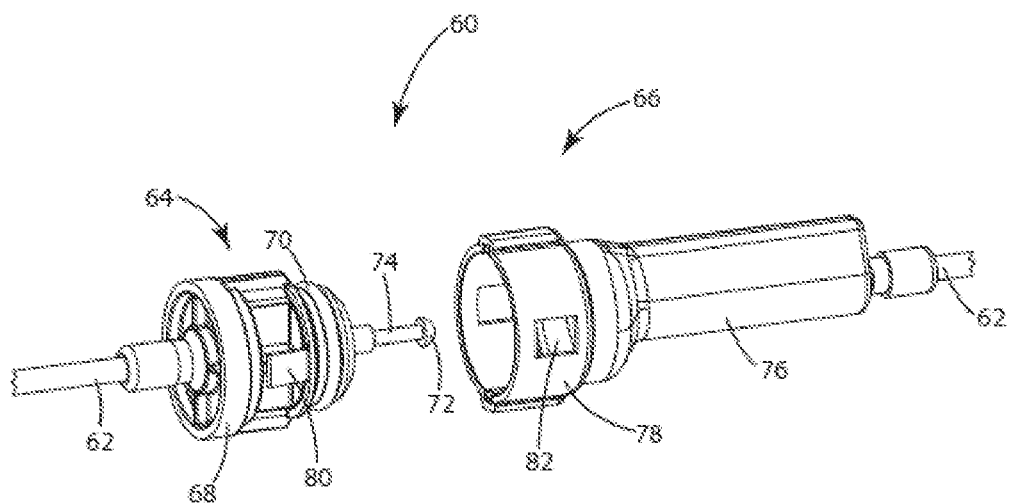
FIG. 8 illustrates a perspective view of a cable connector assembly in a disconnected state.
Figure 9:
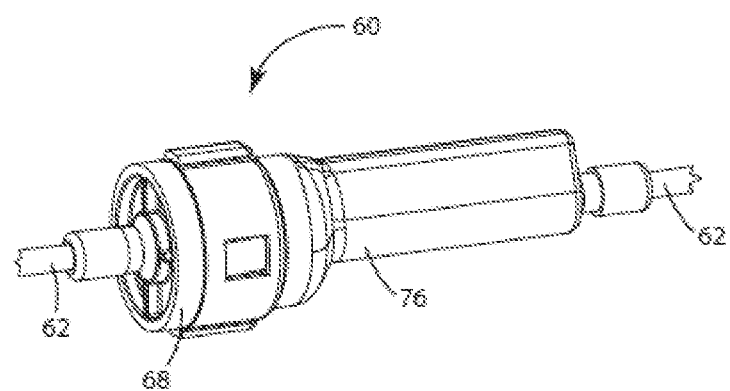
FIG. 9 illustrates a perspective view of a cable connector assembly in a connected state.
Figure 10:
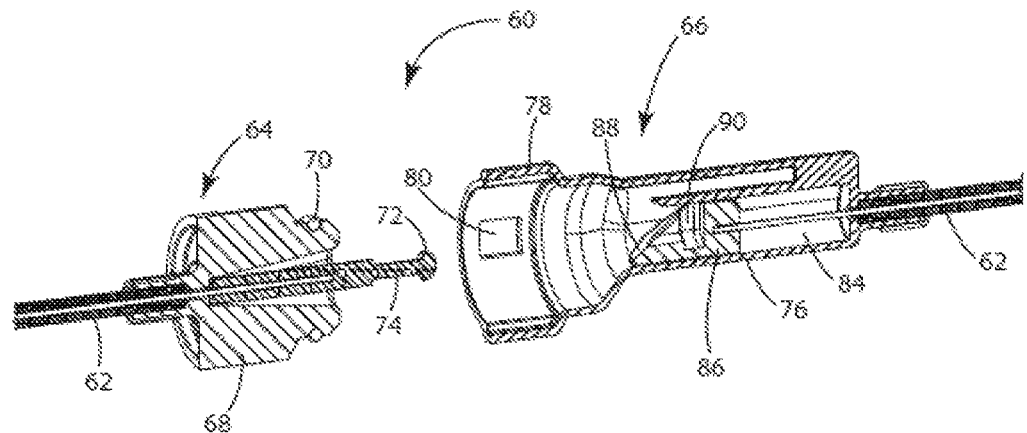
FIG. 10 illustrates a perspective cutaway view of a cable connector assembly in a disconnected state.
Figure 11:
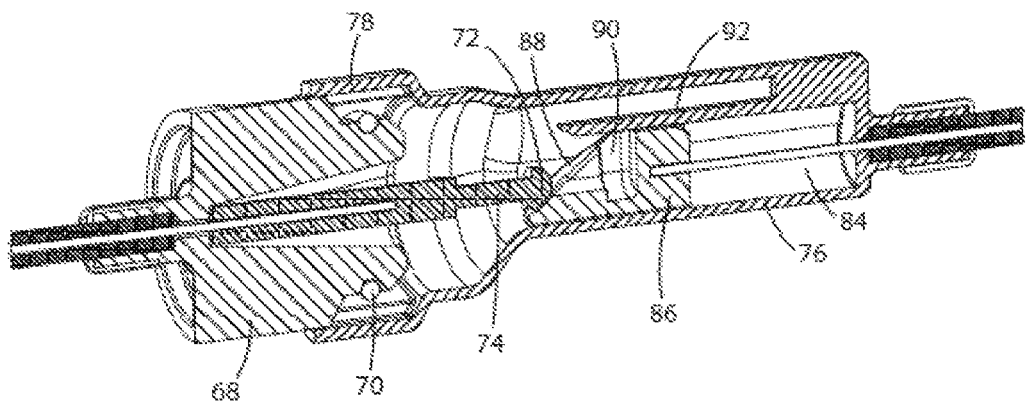
FIG. 11 illustrates a perspective cutaway view of a cable connector assembly in a partially connected state wherein the cable end is engaging the slanted face of the slider.
Figure 12:
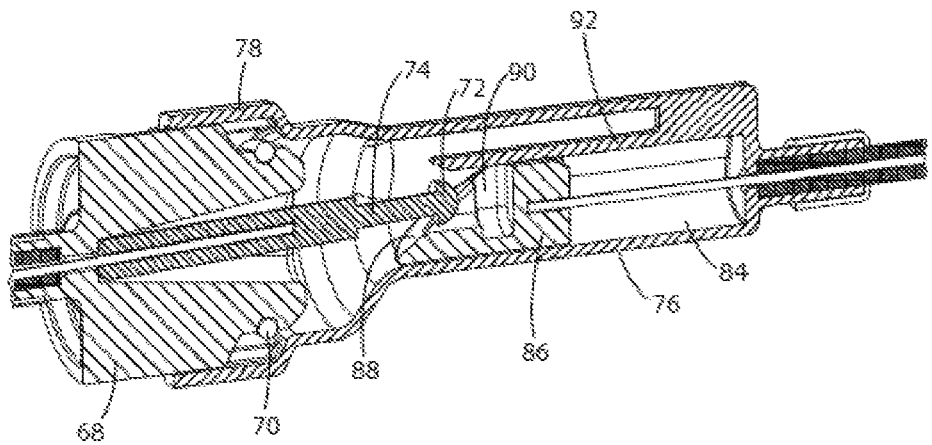
FIG. 12 illustrates a perspective cutaway view of a cable connector assembly in a partially connected state wherein the cable end is engaging the opening on the face of the slider.
Figure 13:
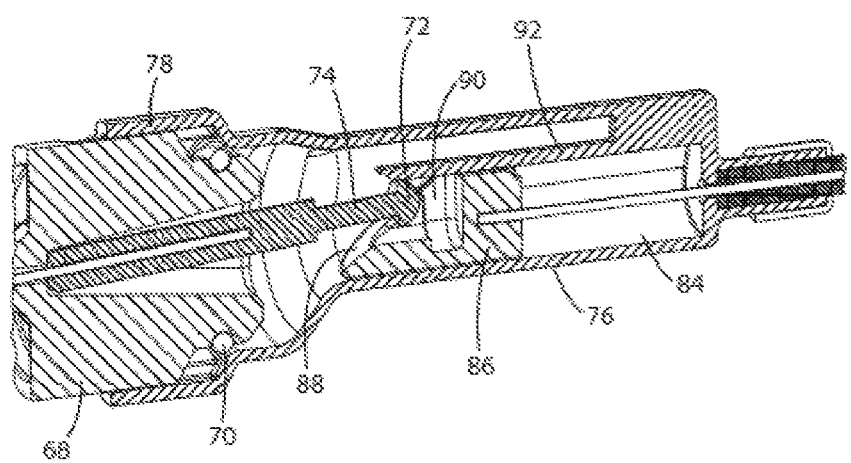
FIG. 13 illustrates a perspective cutaway view of a cable connector assembly in a partially connected state wherein the cable end is engaging the slanted face of the slider and the retention beam.
Figure 14:
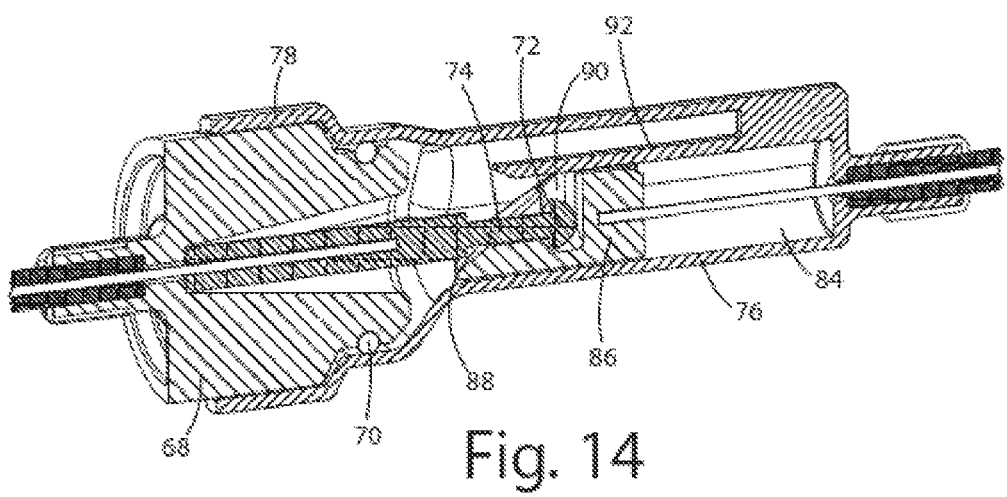
FIG. 14 illustrates a perspective cutaway view of a cable connector assembly in a connected state.

The portion of cable 62 that protrudes from the casing cap 68 may include a cable head 72. The cable head 72 may be composed of any appropriate material, such as zinc dye cast. The cable head 72 may be generally larger in diameter than the end length of cable 74 to which it attaches. For example, as illustrated in FIG. 8, the cable head 72 may comprise a semispherical portion connected to an end length of the cable 74. The semispherical cable head 72 has a diameter larger than the end length of cable 74.

The casing cap 68 may be configured to connect with a housing 76. The housing 76 may be positioned at the end of the second cable section 66 and include a receptacle portion 78 configured to receive the casing cap 68 therein. The receptacle portion 78 may be any appropriate size and shape, such as having a generally hollow cylindrical shape similar to the casing cap 68.

The housing 76 may include an attachment feature to engage the casing cap 68 in a locked configuration. For example, the casing cap 68 may include one or more tabs 80 having a slight protrusion from the outer footprint of the casing cap 68. The tabs 80 may be arranged to engage similarly sized and shaped openings 82 in the housing 72 when the casing cap 68 is inserted into the housing 76. The tabs 80 may lock the casing cap 68 into the housing 76 and may be removed by depressing the tabs 80 and pulling the casing cap 68 and housing 76 engagement apart. It will be appreciated, however, that the casing cap 68 and housing 76 may include any appropriate connection or locking pieces, parts, or components to connect the first and second cable portions 64, 66.

The housing 76 may include components to receive the cable 62 from the first cable section 64 and interconnect it with the cable 62 in the second cable section 66. When interconnected, the sections of cable 62 will move together in unison to translate movement of the release handle to the park release.

The housing 76 may include a slider passage 84 at an end opposite the receptacle portion 78. The slider passage 84 may comprise a generally hollow passage that opens to the receptacle portion 78 at a first end. At a second end, the cable 62 may extend into the slider passage 84.

A slider 86 may be positioned inside the slider passage 84. The slider 86 may be formed of any appropriate material, such as zinc dye cast. The slider 86 may be sized to fit and slide within the slider passage 84. A rear end of the slider 84 may connect to the cable 62 within the slider passage 84. As the slider 86 moves within the slider passage 84, the cable 62 may move concurrently.

The slider 86 may include a ramped face 88 and an opening 90 in the ramped face 88. The ramped face 88 may be located opposite the rear side where the cable 62 is connected and face the receptacle portion 78. The opening 90 may extend from the ramped face 88 into a portion of the slider 86. The opening 90 may be shaped similar to the cable head 72 and the end length of cable 74. Specifically, the opening 90 may include a larger portion to receive the cable head 72 and a thinner portion to receive the end length of cable 74.

A retention beam 92 may be positioned above the slider 86 to assist in locking the cable 62 into the sider 86. The retention beam 92 may be formed of any appropriate material, such as plastic, polymer, metal, or the like, but will preferably be formed of a material capable of flexing, as described below. The retention beam 92 may form a portion of the upper wall of the slider passage 84. The housing 76 may include an open space above the retention beam 92 to allow the retention beam 92 to flex upward. The smallest clearance between the opening 90 and the retention beam 92 is smaller than the diameter of the cable head 72, such that the cable head 72 must force the retention beam 92 to flex upward in order to reach the opening 90 and lock into the slider 86.

In use, the first cable second 64 and second cable section 66 are installed in a vehicle and arranged to be joined together. The cable 62 may extend from a park gear release connected to the first cable section 64 and from a park release handle connected to the second cable section 66. This configuration may also be reversed.

The casing cap 68 from the first cable section 64 may be aligned with the similarly sized and shaped receptacle portion 78 of the second cable section 66. The casing cap 68 may be inserted into the receptacle portion 78 of the housing 76 until the tabs 80 engage the openings 82.

As the casing cap 68 is inserted into the receptacle portion 78, the cable 62 in the first cable section 64 will engage the slider 86. Specifically, the cable head 72 will engage and begin to slide up the ramped face 88. As the cable head 72 approaches the opening 90 that is sized to receive it, the cable head 72 will engage and flex the retention beam 92 upward, thereby applying a downward force on the cable head 72. The downward force will assist in guiding the cable head 72 and end length of cable 74 into the opening 90 to lock the cable 62 into the slider 86. The cable 62 in the first and second cable sections 64, 66 may then move unison.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. A park release handle assembly comprising:
a base having an opening therethrough;
a handle pivotally connected to the base and configured to pivot between a closed position and an open position, the handle connected to a cable to move the cable for actuating a park gear release;
a biasing device configured to bias the handle toward the base;
a lock piece positioned within the opening in the base, the lock piece comprising:
a body having a front tip;
an eyelet formed in the lock piece;
a pin inserted through the eyelet to allow the lock piece to pivot with respect to the base between a front tip up position and a front tip down position; and wherein the eyelet has a width that is wider than a diameter of the pin to allow the lock piece to slide between a forward position toward the handle and to a back position away from the handle;

a lock piece reset comprising a protrusion formed on the handle and positioned to contact and move the lock piece from the back position to the forward position when the handle is moved from the closed position to the open position; and an extension spring connected to the lock piece.

2. The park release handle assembly of claim 1, further comprising an arm connected to the handle.

3. The park release handle assembly of claim 2, wherein the arm is configured to extend through the opening when the handle is in the closed position.

4. The park release handle assembly of claim 2, wherein the lock piece is configured to engage the arm and hold the handle in the open position.

5. The park release handle assembly of claim 4, wherein the arm is configured to apply a force to the lock piece when in the open position to move the lock piece to the back position.

6. The park release handle assembly of claim 4, wherein the handle is releasable from the open position by pulling the handle away from the base to allow the lock piece to pivot to the back position and the front tip up position.

7. The park release handle assembly of claim 2, wherein the lock piece, when in the forward position and the front tip down position, is configured to engage the arm when rotating from the open position to the closed position.

8. The park release handle assembly of claim 2, wherein the lock piece, when in the back position and the front tip up position, is configured to allow the arm to pass by the front tip when rotating from the open position to the closed position.

9. The park release handle assembly of claim 1, wherein the extension spring is configured to bias the lock piece to the front tip down position when the lock piece is in the forward position.

10. The park release handle assembly of claim 1, wherein the extension spring is configured to bias the lock piece to the front tip up position when the lock piece is in the back position.

* * * * *